(12) United States Patent
Zhang et al.

(10) Patent No.: US 11,791,864 B2
(45) Date of Patent: Oct. 17, 2023

(54) PLC CONTROL METHOD AND APPARATUS

(71) Applicant: Huawei Technologies Co., Ltd., Shenzhen (CN)

(72) Inventors: Fan Zhang, Wuhan (CN); Peng Xiao, Shenzhen (CN); Wei Zhong, Shenzhen (CN); Fang Xia, Wuhan (CN); Dao Pan, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 441 days.

(21) Appl. No.: 17/199,165

(22) Filed: Mar. 11, 2021

(65) Prior Publication Data

US 2021/0203381 A1 Jul. 1, 2021

Related U.S. Application Data

(63) Continuation of application No. PCT/CN2018/107319, filed on Sep. 25, 2018.

(51) Int. Cl.
*H04B 3/56* (2006.01)
*H04B 3/04* (2006.01)
*H04B 3/46* (2015.01)

(52) U.S. Cl.
CPC .............. *H04B 3/56* (2013.01); *H04B 3/04* (2013.01); *H04B 3/46* (2013.01)

(58) Field of Classification Search
CPC .............. H04B 3/56; H04B 3/46; H04B 3/04
See application file for complete search history.

(56) References Cited

U.S. PATENT DOCUMENTS

| 10,320,445 | B2 | 7/2019 | Okada et al. | |
|---|---|---|---|---|
| 2012/0183085 | A1 | 7/2012 | Hurwitz et al. | |
| 2014/0112399 | A1 | 4/2014 | Reuven | |
| 2015/0117503 | A1* | 4/2015 | Schneider | H04B 3/54 375/222 |
| 2020/0037439 | A1* | 1/2020 | Kim | H05K 1/115 |

FOREIGN PATENT DOCUMENTS

| CN | 1988404 | A | 6/2007 |
|---|---|---|---|
| CN | 104242987 | A | 12/2014 |
| CN | 104539316 | A | 4/2015 |
| CN | 107148769 | A | 9/2017 |
| JP | 2001230708 | A | 8/2001 |

* cited by examiner

*Primary Examiner* — Gerald Johnson
(74) *Attorney, Agent, or Firm* — Slater Matsil, LLP

(57) ABSTRACT

A PLC control method includes: transmit a first signal through a neutral wire and a path between the neutral wire and a differential signal processing circuit; transmit a second signal through a live wire and a path between the live wire and the differential signal processing circuit; and disconnecting the path between the differential signal processing circuit and the neutral wire or the live wire, conducting the differential signal processing circuit to a ground wire, and when a transmission rate of the ground wire is greater than or equal to a preset transmission rate threshold, transmitting the first signal or the second signal through the ground wire and a path between the ground wire and the differential signal processing circuit.

10 Claims, 12 Drawing Sheets

PLC CONTROL METHOD AND APPARATUS

CROSS-REFERENCE TO RELATED APPLICATIONS

This application is a continuation of International Application No. PCT/CN2018/107319, filed on Sep. 25, 2018, the disclosure of which is hereby incorporated by reference in its entirety.

TECHNICAL FIELD

This application relates to the field of power system technologies, and in particular, to a PLC control method and apparatus.

BACKGROUND

A power line communication (PLC) network is a network in which broadband data is transmitted through existing power lines. In comparison with a digital subscriber line (DSL) that uses a telephone line and a cable modem (CM) that uses a coaxial cable line of a cable television, in the PLC network, the broadband data is transmitted through the existing power lines, and power lines with a wide coverage area can be directly used, without laying additional network lines.

To transmit the broadband data through the power lines, a power line communication modem used for processing data or signals needs to be configured in the PLC network first. Then the existing power lines and sockets are used to establish a network, to connect to network access terminals (PCs, broadband network access devices, set-top boxes, audio devices, monitoring devices, and other intelligent electrical devices) of users to transmit data, voice, and videos. In power line communication, signals are usually transmitted in a differential transmission mode. Differential transmission is a signal transmission technology. A difference from a conventional method with one signal wire and one ground wire lies in that, in differential transmission, signals are transmitted on both wires, and the two signals have a same amplitude and opposite phases. As shown in FIG. 1, a conventional power line communication modem includes a PLC chip, and two signal output ends of the PLC chip are respectively connected to a neutral wire and a live wire in a power line through analog circuits. Two signals sent by the PLC chip are respectively output, in a coupled manner, to the live wire and the neutral wire of the power line to implement broadband network access through the power line.

However, because the power line is not a line specially designed for communication, a power grid noise and an electrical device noise exist in the power line, and the power line communication modem is susceptible to the noises. With varying quality of different electrical devices, the electrical device noise in the power line increases as a quantity of electrical devices in a circuit increases. The increase of the electrical device noise results in a decrease in a transmission signal-to-noise ratio in the PLC network. This decreases a transmission rate of the power line communication modem.

SUMMARY

This application provides a PLC control method and apparatus, to resolve a problem in a conventional technology that a transmission rate of a power line communication modem is low because a power grid noise and an electrical device noise exist in a power line.

According to a first aspect, this application provides a power line communication PLC control method, for transmitting a differential signal, where the differential signal includes a first signal and a second signal, and the method includes: conducting a differential signal processing circuit to a neutral wire, and transmitting the first signal through the neutral wire and a path between the neutral wire and the differential signal processing circuit, where the differential signal processing circuit is configured to process the differential signal; conducting the differential signal processing circuit to a live wire, and transmitting the second signal through the live wire and a path between the live wire and the differential signal processing circuit; and disconnecting the path between the differential signal processing circuit and the neutral wire, conducting the differential signal processing circuit to a ground wire, and when a transmission rate of the ground wire is greater than or equal to a preset transmission rate threshold, transmitting the first signal through the ground wire and a path between the ground wire and the differential signal processing circuit.

In this implementation, the path between the differential signal processing circuit and the neutral wire is disconnected, and the differential signal processing circuit is conducted to the ground wire. When it is detected that the ground wire exists, the first signal is transmitted through the ground wire and the path between the ground wire and the differential signal processing circuit. Because interference to the ground wire in a power line is small, the first signal in the differential signal processing circuit is transmitted through the ground wire, so that a part of power grid noise is isolated, and a transmission signal-to-noise ratio increases, thereby increasing a transmission rate of a power line communication modem.

With reference to the first aspect, in a possible implementation, the method further includes: disconnecting the path between the differential signal processing circuit and the live wire, conducting the differential signal processing circuit to the neutral wire, and transmitting the second signal through the neutral wire and a path between the neutral wire and the differential signal processing circuit. In this implementation, the second signal may be transmitted through the neutral wire and the path between the neutral wire and the differential signal processing circuit. When a transmission failure occurs on the live wire, smooth transmission of the second signal can be ensured.

With reference to the first aspect, in a possible implementation, the method further includes: conducting the differential signal processing circuit to the neutral wire, and transmitting the second signal jointly through the neutral wire, a path between the neutral wire and the differential signal processing circuit, the live wire, and the path between the live wire and the differential signal processing circuit. In this implementation, the second signal may be transmitted jointly through the neutral wire, the path between the neutral wire and the differential signal processing circuit, the live wire, and the path between the live wire and the differential signal processing circuit, so that there is more than one path for transmitting the second signal, and a transmission rate of the second signal can be increased.

According to a second aspect, this application provides a power line communication PLC control method, for transmitting a differential signal, where the differential signal includes a first signal and a second signal, and the method includes: conducting a differential signal processing circuit to a neutral wire, and transmitting the first signal through the neutral wire and a path between the neutral wire and the differential signal processing circuit, where the differential signal processing circuit is configured to process the differential signal; conducting the differential signal processing circuit to a live wire, and transmitting the second signal through the live wire and a path between the live wire and the differential signal processing circuit; and disconnecting the path between the differential signal processing circuit and the live wire, conducting the differential signal processing circuit to the ground wire, and when a transmission rate of the ground wire is greater than or equal to a preset transmission rate threshold, transmitting the second signal through the ground wire and a path between the ground wire and the differential signal processing circuit.

In this implementation, the path between the differential signal processing circuit and the live wire is disconnected, and the differential signal processing circuit is conducted to the ground wire. When it is detected that the ground wire exists, the second signal is transmitted through the ground wire and the path between the ground wire and the differential signal processing circuit. Because interference to the ground wire in a power line is small, the second signal in the differential signal processing circuit is transmitted through the ground wire, so that a part of power grid noise is isolated, and a transmission signal-to-noise ratio increases, thereby increasing a transmission rate of a power line communication modem.

With reference to the second aspect, in a possible implementation, the method further includes: disconnecting the path between the differential signal processing circuit and the neutral wire, conducting the differential signal processing circuit to the live wire, and transmitting the first signal through the live wire and a path between the live wire and the differential signal processing circuit. In this implementation, the first signal may be transmitted through the live wire and the path between the live wire and the differential signal processing circuit. When a transmission failure occurs on the neutral wire, smooth transmission of the first signal can be ensured.

With reference to the second aspect, in a possible implementation, the method further includes: conducting the differential signal processing circuit to the live wire, and transmitting the first signal jointly through the live wire, a path between the live wire and the differential signal processing circuit, the neutral wire, and the path between the neutral wire and the differential signal processing circuit. In this implementation, the first signal may be transmitted jointly through the neutral wire, the path between the neutral wire and the differential signal processing circuit, the live wire, and the path between the live wire and the differential signal processing circuit, so that there is more than one path for transmitting the first signal, and a transmission rate of the first signal can be increased.

According to a third aspect, this application provides a PLC control apparatus, including a PLC chip, a first switch, and a differential signal processing circuit. The differential signal processing circuit is configured to process a differential signal. The differential signal includes a first signal and a second signal. A first signal end of the differential signal processing circuit is for transmitting the first signal. A second signal end of the differential signal processing circuit is used to transmit the second signal. The PLC chip has a control signal end, and the control signal end is used to output a control signal. The first signal end is respectively connected to a live wire and a ground wire through the first switch. The second signal is transmitted through the live wire and a path between the live wire and the second signal end. The PLC chip is configured to output the control signal through the control signal end. The control signal is used to control the first switch to conduct the first signal end to a neutral wire, and the first signal is transmitted through the neutral wire and a path between the neutral wire and the first signal end. The control signal is further used to control the first switch to disconnect the path between the first signal end and the neutral wire, and control the first switch to conduct the first signal end to the ground wire. When a transmission rate of the ground wire is greater than or equal to a preset transmission rate threshold, the first signal is transmitted through the ground wire and a path between the ground wire and the first signal end.

In this implementation, the PLC chip controls, through the control signal end, the first switch to disconnect the path between the first signal end and the neutral wire, and conduct the first signal end to the ground wire. When it is detected that the ground wire exists, the first signal is transmitted through the ground wire and the path between the ground wire and the first signal end. Because interference to the ground wire in a power line is small, the first signal is transmitted through the ground wire, so that a part of power grid noise is isolated, and a transmission signal-to-noise ratio increases, thereby increasing a transmission rate of a power line communication modem.

With reference to the third aspect, in a possible implementation, the apparatus further includes a second switch. The second signal end is respectively connected to the live wire and the neutral wire through the second switch. The control signal is further used to control the second switch to disconnect a path between the second signal end and the live wire, and control the second switch to conduct the second signal end to the neutral wire. The second signal is transmitted through the neutral wire and a path between the neutral wire and the second signal end.

With reference to the third aspect, in a possible implementation, the apparatus further includes a second switch. The second signal end is connected to the neutral wire through the second switch. The control signal is further used to control the second switch to conduct the second signal end to the neutral wire. The second signal is transmitted jointly through the neutral wire, a path between the neutral wire and the second signal end, the live wire, and a path between the live wire and the second signal end.

With reference to the possible implementation of the third aspect, in a possible implementation, the apparatus further includes a coupling capacitor. Two ends of the coupling capacitor are electrically connected to the second switch and the neutral wire respectively. In this implementation, a differential-mode noise between the neutral wire and the live wire is reduced, and a transmission signal-to-noise ratio is further increased.

According to a fourth aspect, this application provides a PLC control apparatus, including a PLC chip, a second switch, and a differential signal processing circuit. The differential signal processing circuit is configured to process the differential signal. The differential signal includes a first signal and a second signal. A first signal end of the differential signal processing circuit is used to transmit the first signal. A second signal end of the differential signal processing circuit is used to transmit the second signal. The PLC chip has a control signal end, and the control signal end is used to output a control signal. The second signal end is respectively connected to a neutral wire and a ground wire through the second switch. The first signal is transmitted through the neutral wire and a path between the neutral wire and the first signal end. The PLC chip is configured to output the control signal through the control signal end. The control signal is used to control the second switch to conduct the second signal end to a live wire, and the second signal is transmitted through the live wire and a path between the live wire and the second signal end. The control signal is further used to control the second switch to disconnect the path between the second signal end and the live wire, and control the second switch to conduct the second signal end to the ground wire. When a transmission rate of the ground wire is greater than or equal to a preset transmission rate threshold, the second signal is transmitted through the ground wire and a path between the ground wire and the second signal end.

In this implementation, the PLC chip controls, through the control signal end, the second switch to disconnect the path between the second signal end and the live wire, and conduct the second signal end to the ground wire. When it is detected that the ground wire exists, the second signal is transmitted through the ground wire and the path between the ground wire and the second signal end. Because interference to the ground wire in a power line is small, the second signal is transmitted through the ground wire, so that a part of power grid noise is isolated, and a transmission signal-to-noise ratio increases, thereby increasing a transmission rate of a power line communication modem.

With reference to the fourth aspect, in a possible implementation, the apparatus further includes a first switch. The first signal end is respectively connected to the live wire and the neutral wire through the first switch. The control signal is further used to control the first switch to disconnect the path between the first signal end and the neutral wire, and control the first switch to conduct the first signal end to the live wire. The first signal is transmitted through the live wire and a path between the live wire and the first signal end.

With reference to the fourth aspect, in a possible implementation, the apparatus further includes a first switch. The first signal end is connected to the live wire through the first switch. The control signal is further used to control the first switch to conduct the first signal end to the live wire. The first signal is transmitted jointly through the neutral wire, the path between the neutral wire and the first signal end, the live wire, and a path between the live wire and the first signal end.

With reference to the possible implementation of the fourth aspect, in a possible implementation, the apparatus further includes a coupling capacitor. Two ends of the coupling capacitor are electrically connected to the first switch and the live wire respectively. In this implementation, a differential-mode noise between the neutral wire and the live wire is reduced, and a transmission signal-to-noise ratio is further increased.

According to a fifth aspect, this application provides a PLC chip, configured to transmit a differential signal, where the differential signal includes a first signal and a second signal, and the PLC chip includes: a first signal transmission control module, configured to conduct a differential signal processing circuit to a neutral wire, and transmit the first signal through the neutral wire and a path between the neutral wire and the differential signal processing circuit, where the differential signal processing circuit is configured to process the differential signal; a second signal transmission control module, configured to conduct the differential signal processing circuit to a live wire, and transmit the second signal through the live wire and a path between the live wire and the differential signal processing circuit; and a first signal transmission switching module, configured to disconnect the path between the differential signal processing circuit and the neutral wire, conduct the differential signal processing circuit to the ground wire, and when a transmission rate of the ground wire is greater than or equal to a preset transmission rate threshold, transmit the first signal through the ground wire and a path between the ground wire and the differential signal processing circuit.

In this implementation, the first signal transmission switching module disconnects the path between the differential signal processing circuit and the neutral wire or the live wire, and conducts the differential signal processing circuit to the ground wire. When it is detected that the ground wire exists, the first signal or the second signal is transmitted through the ground wire and the path between the ground wire and the differential signal processing circuit. Because interference to the ground wire in a power line is small, any signal in the differential signal processing circuit is transmitted through the ground wire, so that a part of power grid noise is isolated, and a transmission signal-to-noise ratio increases, thereby increasing a transmission rate of a power line communication modem.

With reference to the fifth aspect, in a possible implementation, the first signal transmission switching module further includes a first signal transmission switching unit, configured to disconnect the path between the differential signal processing circuit and the live wire, conduct the differential signal processing circuit to the neutral wire, and transmit the second signal through the neutral wire and a path between the neutral wire and the differential signal processing circuit.

With reference to the fifth aspect, in a possible implementation, the first signal transmission switching module further includes a second signal transmission switching unit, configured to conduct the differential signal processing circuit to the neutral wire, and transmit the second signal jointly through the neutral wire, a path between the neutral wire and the differential signal processing circuit, the live wire, and the path between the live wire and the differential signal processing circuit.

According to a sixth aspect, this application provides a PLC chip, configured to transmit a differential signal, where the differential signal includes a first signal and a second signal, and the PLC chip includes: a third signal transmission control module, configured to conduct a differential signal processing circuit to a neutral wire, and transmit the first signal through the neutral wire and a path between the neutral wire and the differential signal processing circuit, where the differential signal processing circuit is configured to process the differential signal; a fourth signal transmission control module, configured to conduct the differential signal processing circuit to a live wire, and transmit the second signal through the live wire and a path between the live wire and the differential signal processing circuit; and a second signal transmission switching module, configured to disconnect the path between the differential signal processing circuit and the live wire, conduct the differential signal processing circuit to the ground wire, and when a transmission rate of the ground wire is greater than or equal to a preset transmission rate threshold, transmit the second signal through the ground wire and a path between the ground wire and the differential signal processing circuit.

In this implementation, the second signal transmission switching module disconnects the path between the differential signal processing circuit and the neutral wire or the live wire, and conducts the differential signal processing circuit to the ground wire. When it is detected that the ground wire exists, the first signal or the second signal is transmitted through the ground wire and the path between the ground wire and the differential signal processing circuit.

Because interference to the ground wire in a power line is small, any signal in the differential signal processing circuit is transmitted through the ground wire, so that a part of power grid noise is isolated, and a transmission signal-to-noise ratio increases, thereby increasing a transmission rate of a power line communication modem.

With reference to the sixth aspect, in a possible implementation, the second signal transmission switching module further includes a third signal transmission switching unit, configured to disconnect the path between the differential signal processing circuit and the neutral wire, conduct the differential signal processing circuit to the live wire, and transmit the first signal through the live wire and a path between the live wire and the differential signal processing circuit.

With reference to the sixth aspect, in a possible implementation, the second signal transmission switching module further includes a fourth signal transmission switching unit, configured to conduct the differential signal processing circuit to the live wire, and transmit the first signal jointly through the live wire, a path between the live wire and the differential signal processing circuit, the neutral wire, and the path between the neutral wire and the differential signal processing circuit.

According to a seventh aspect, this application provides a chip, including: a processor; and a memory, configured to store a computer-executable instruction. When executing the computer-executable instruction, the processor performs the method in any one of the first aspect or the possible implementations of the first aspect.

According to an eighth aspect, this application provides a chip, including: a processor; and a memory, configured to store a computer-executable instruction. When executing the computer-executable instruction, the processor performs the method in any one of the second aspect or the possible implementations of the second aspect.

BRIEF DESCRIPTION OF THE DRAWINGS

To describe the technical solutions in this application more clearly, the following briefly describes the accompanying drawings for describing the embodiments. It is clear that, a person of ordinary skill in the art may derive other drawings from these accompanying drawings without creative efforts.

DETAILED DESCRIPTION OF ILLUSTRATIVE EMBODIMENTS

To make a person skilled in the art understand the technical solutions in the embodiments of this application better, the following further describes the technical solutions in the embodiments of this application in detail with reference to the accompanying drawings.

To better describe the technical solutions provided in this application, a PLC network is briefly described first. The PLC network is a special network in which signals are transmitted through existing power lines. Before network data is transmitted, user data is modulated using a modulation technology, and a high frequency that carries information is loaded to a current and then transmitted through a power line. At a receive end, a modulated signal is extracted by a filter and then demodulated to obtain the original network data, and the original network data is transmitted to a network terminal device to implement information transfer.

Figure 1:
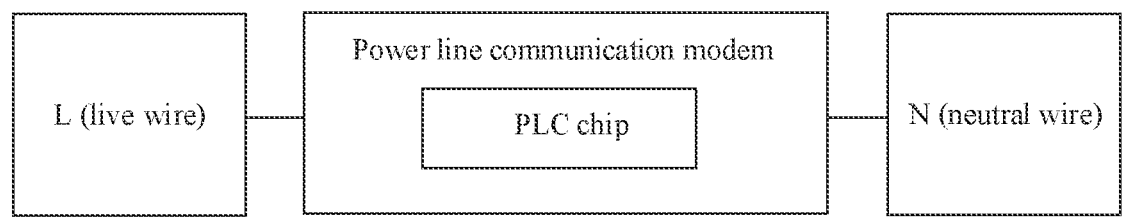
FIG. 1 is a schematic diagram of a connection between a conventional power line communication modem and a power line.
Figure 2:
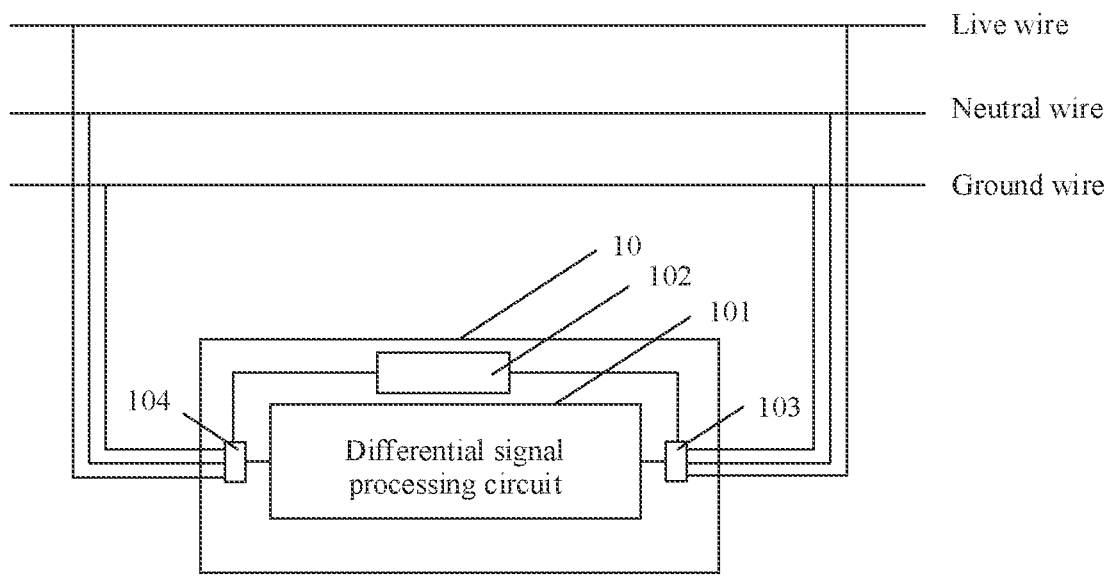
FIG. 2 is a schematic structural diagram of a power line communication modem according to an embodiment of this application.

During data transmission in the PLC network, data from a user is input to a power line communication modem for modulation, and then a modulated signal is transmitted to a central office device through a power line. The central office device is configured to demodulate the signal. A power grid noise and an electrical device noise exist in the power line. The power grid noise is a noise generated around the power line by an alternating current of a transmission line in a power grid. The electrical device noise includes a noise generated when an alternating-current relay in the power grid works. The noises result in a decrease in a transmission signal-to-noise ratio in the PLC network. This decreases a transmission rate of the power line communication modem. In view of the foregoing problem, this application provides a PLC control method. To describe the PLC control method provided in this application in more details, an embodiment of this application first provides a power line communication modem. FIG. 2 is a schematic structural diagram of a power line communication modem according to an embodiment of this application. A differential signal processing circuit 101, a switch control module 102, a first switch 103, and a second switch 104 are disposed in the power line communication modem 10. The differential signal processing circuit 101 is configured to process a differential signal generated by the power line communication modem 10. The differential signal includes a first signal and a second signal. The switch control module 102 is configured to control the first switch 103 and the second switch 104. The switch control module 102 may control each of the first switch 103 and the second switch 104 to connect to a neutral wire, a live wire, and a ground wire in a power grid.

Figure 3:
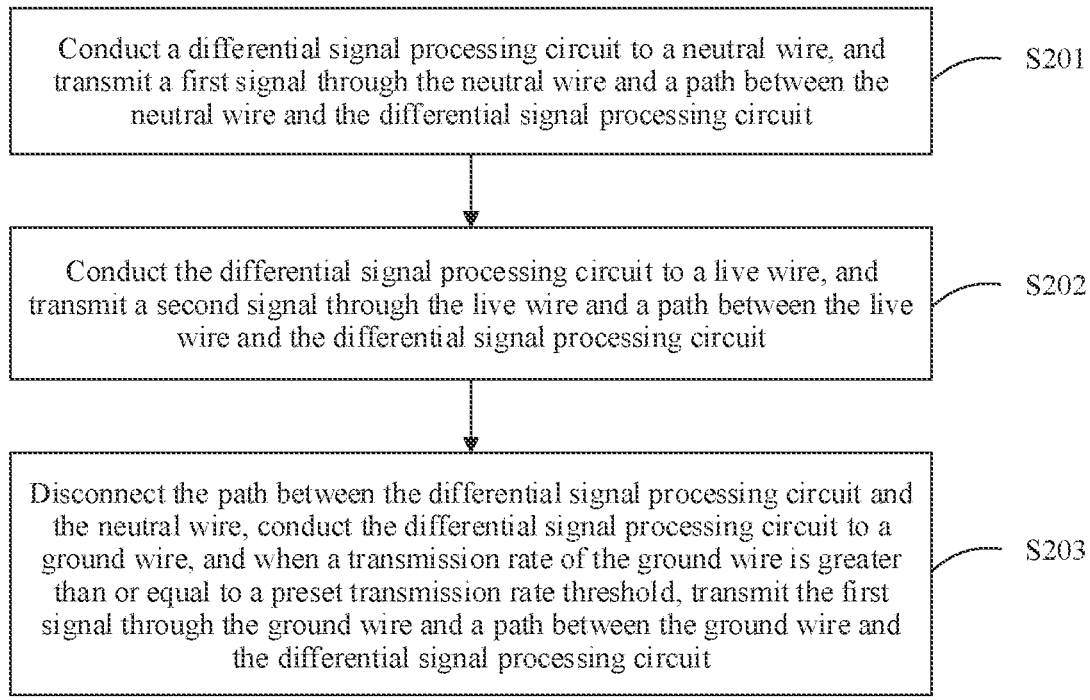
FIG. 3 is a schematic flowchart of a PLC control method according to an embodiment of this application.

It should be noted that the first switch 103 and the second switch 104 may be physical switches or MOS switches. This is not specifically limited in this application. Solid lines connecting the first switch 103 and the second switch 104 to the neutral wire, the live wire, and the ground wire do not indicate signal connections herein, but are merely intended to illustrate that both the first switch 103 and the second switch 104 can be connected to the neutral wire, the live wire, and the ground wire. In addition, the first switch 103 and the second switch 104 may be alternatively disposed outside the power line communication modem 10 as required. FIG. 3 is a schematic flowchart of a PLC control method according to this application. Referring to FIG. 3, the PLC control method includes the following steps.

S201. Conduct a differential signal processing circuit to a neutral wire, and transmit a first signal through the neutral wire and a path between the neutral wire and the differential signal processing circuit.

After modulating network data, the power line communication modem 10 generates a differential signal, and the differential signal processing circuit 101 processes the differential signal. The switch control module 102 controls the first switch 103 to conduct the differential signal processing circuit 101 to the neutral wire, and the first signal is transmitted through the neutral wire and the path between the neutral wire and the differential signal processing circuit 101. In this case, the first switch 103 conducts only the differential signal processing circuit 101 to the neutral wire, and does not conduct the differential signal processing circuit 101 to a live wire or a ground wire.

S202. Conduct the differential signal processing circuit to the live wire, and transmit a second signal through the live wire and a path between the live wire and the differential signal processing circuit.

Corresponding to the foregoing descriptions, the switch control module 102 controls the second switch 104 to conduct the differential signal processing circuit 101 to the live wire, and the second signal is transmitted through the live wire and the path between the live wire and the differential signal processing circuit 101. In this case, the second switch also conducts only the differential signal processing circuit 101 to the live wire, and does not conduct the differential signal processing circuit 101 to the neutral wire or the ground wire.

S203. Disconnect the path between the differential signal processing circuit and the neutral wire, conduct the differential signal processing circuit to the ground wire, and when a transmission rate of the ground wire is greater than or equal to a preset transmission rate threshold, transmit the first signal through the ground wire and a path between the ground wire and the differential signal processing circuit.

Figure 4:
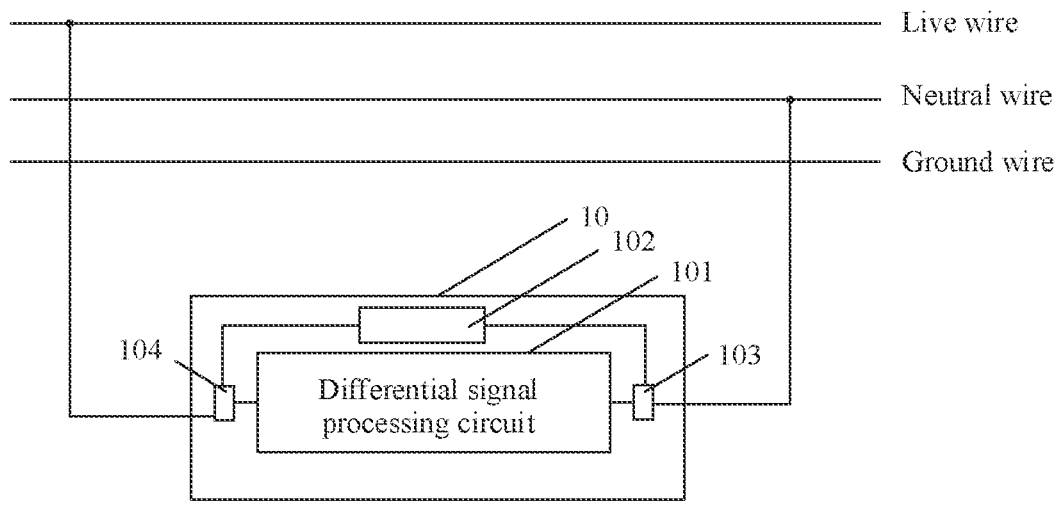
FIG. 4 is a schematic diagram of transmitting a differential signal by a power line communication modem according to an embodiment of this application.

After the foregoing control is completed, FIG. 4 is a schematic diagram of transmitting a differential signal by a power line communication modem according to an embodiment of this application. The first signal in the differential signal is transmitted through the neutral wire and the path between the neutral wire and the differential signal processing circuit 101, and the second signal is transmitted through the live wire and the path between the live wire and the differential signal processing circuit 101. A differential signal transmission mode is the same as a conventional transmission mode. In this embodiment, to increase a signal-to-noise ratio in a differential signal transmission process, in an example embodiment, the switch control module 102 controls the first switch 103 to disconnect the path between the differential signal processing circuit 101 and the neutral wire, and the differential signal processing circuit 101 and a neutral wire connection end are connected to a ground wire end through the first switch 103. The ground wire end is a ground wire signal receiving port.

After the differential signal processing circuit 101 is connected to the ground wire end, the first signal is transmitted to the ground wire, and a transmission rate of the first signal is obtained. Generally, if the ground wire exists and performs transmission properly, the first signal input to the ground wire can be normally transmitted. However, if no ground wire exists or a transmission failure occurs on the ground wire, no line serves as a path for transmitting the first signal input to the ground wire or a transmission path fails. In this case, the transmission rate of the first signal is 0 or approximately 0. Therefore, in this embodiment, a transmission rate threshold is preset. The first signal is input to the ground wire, and if the transmission rate is greater than or equal to the transmission rate threshold, it indicates that the ground wire exists and performs transmission properly. The first signal is transmitted through the ground wire and the path between the ground wire and the differential signal processing circuit.

For example, the first signal is input to the ground wire end, an obtained transmission rate is 5 M/s, and the transmission rate threshold is 0.5 M/s. It may be determined that the ground wire exists and performs transmission properly. However, if the obtained transmission rate is 0 or 0.1 M/s, no ground wire exists in a power line, or a transmission failure occurs on the ground wire. It should be noted that, even if the ground wire exists, a transmission rate may be small if a transmission failure occurs on the ground wire. Therefore, the transmission rate threshold in this embodiment is a value greater than 0, and the transmission rate threshold cannot be excessively large. For example, in the PLC network, a normal transmission rate is 5 M/s, and the transmission rate threshold is set to 4 M/s. Although a transmission rate is less than 4 M/s in a period of time due to an external factor of a line, the ground wire exists in this case. Therefore, the transmission rate threshold in this embodiment should not be excessively large. Certainly, the foregoing value is merely an example. The transmission rate threshold in this embodiment may be a preset transmission rate value; or a first transmission rate, in a historical record, at which the first signal is transmitted through the neutral wire or the live wire may be used as the transmission rate threshold; or the first transmission rate may be multiplied by a coefficient to obtain the transmission rate threshold in this embodiment. The transmission rate threshold is not specifically limited in this embodiment.

Figure 5:
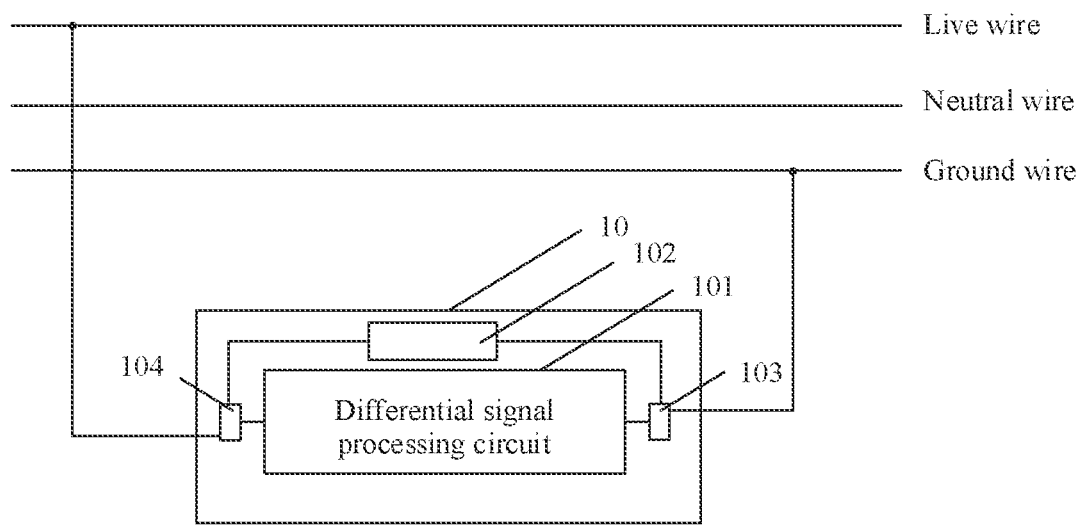
FIG. 5 is a schematic diagram of transmitting a differential signal by a power line communication modem according to an embodiment of this application.
Figure 6:
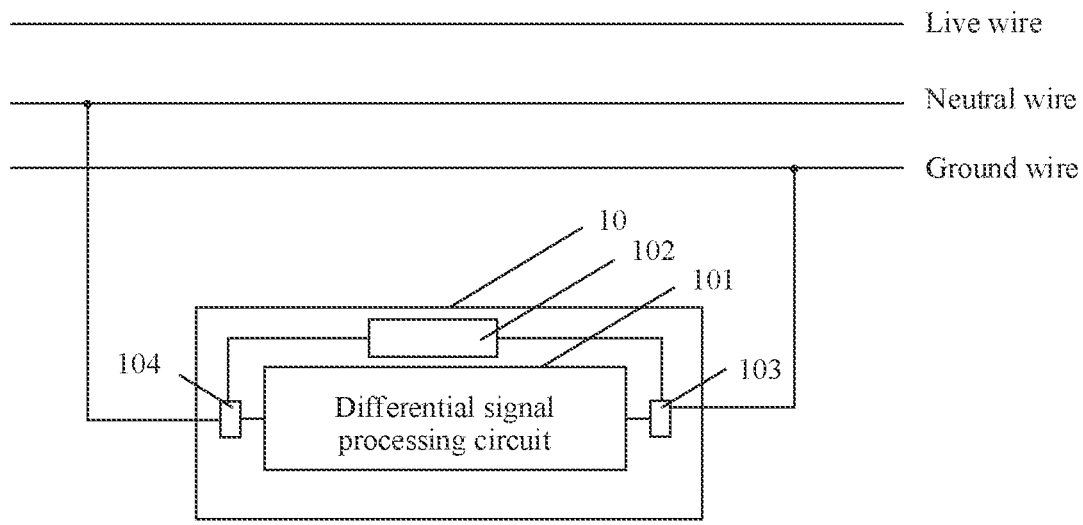
FIG. 6 is a schematic diagram of transmitting a differential signal by a power line communication modem according to an embodiment of this application.

FIG. 5 is a schematic diagram of transmitting a differential signal by a power line communication modem according to an embodiment of this application. After the first signal is transmitted through the ground wire and the path between the ground wire and the differential signal processing circuit 101, the second signal may still be transmitted through the live wire and the path between the live wire and the differential signal processing circuit. Alternatively, FIG. 6 is a schematic diagram of transmitting a differential signal by a power line communication modem according to an embodiment of this application. The switch control module 102 controls the second switch 104 to disconnect the path between the differential signal processing circuit 101 and the live wire, and conduct the differential signal processing circuit 101 to the neutral wire. The second signal is transmitted through the neutral wire and a path between the neutral wire and the differential signal processing circuit 101.

Figure 7:
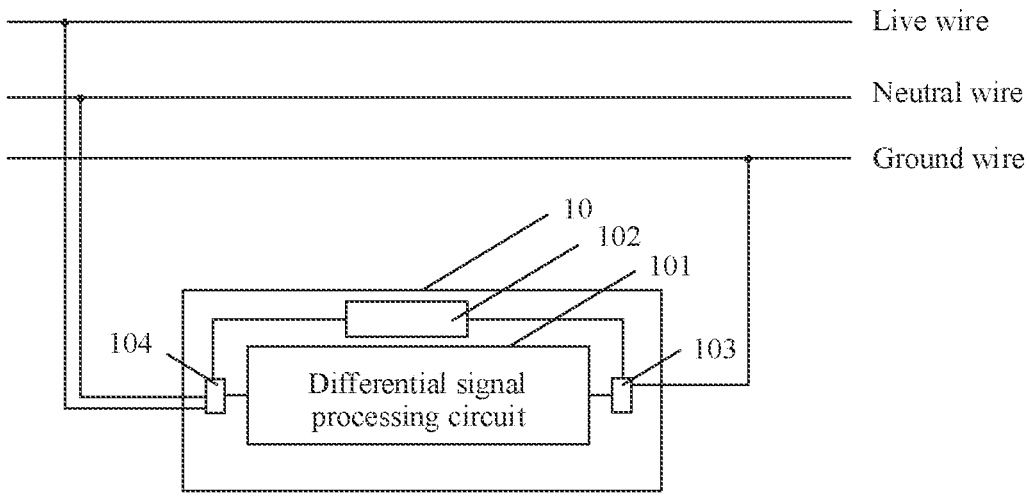
FIG. 7 is a schematic diagram of transmitting a differential signal by a power line communication modem according to an embodiment of this application.

In the foregoing two cases, the second signal is transmitted through one line. In another example embodiment, after the first signal is transmitted through the ground wire and the path between the ground wire and the differential signal processing circuit 101, the second signal is transmitted through both the neutral wire and the ground wire. FIG. 7 is a schematic diagram of transmitting a differential signal by a power line communication modem according to an embodiment of this application. The switch control module 102 controls the second switch 104 to retain a connection between the live wire and the differential signal processing circuit 101, and further controls the second switch 104 to conduct the differential signal processing circuit to the neutral wire again. The second signal is transmitted jointly through the neutral wire, a path between the neutral wire and the differential signal processing circuit, the live wire, and the path between the live wire and the differential signal processing circuit.

It can be learned from the foregoing embodiment that, because interference to the ground wire is small, the first signal is transmitted through the ground wire, so that a part of power grid noise is isolated. Regardless of whether the second signal is transmitted through the live wire, the neutral wire, or both the neutral wire and the live wire, a transmission signal-to-noise ratio of the power line communication modem is increased compared with that in a conventional transmission mode.

In the foregoing embodiment, the first signal is transmitted through the ground wire and the path between the ground wire and the differential signal processing circuit 101, and the second signal may be transmitted through the neutral wire, the live wire, or both the neutral wire and the live wire.

Figure 8:
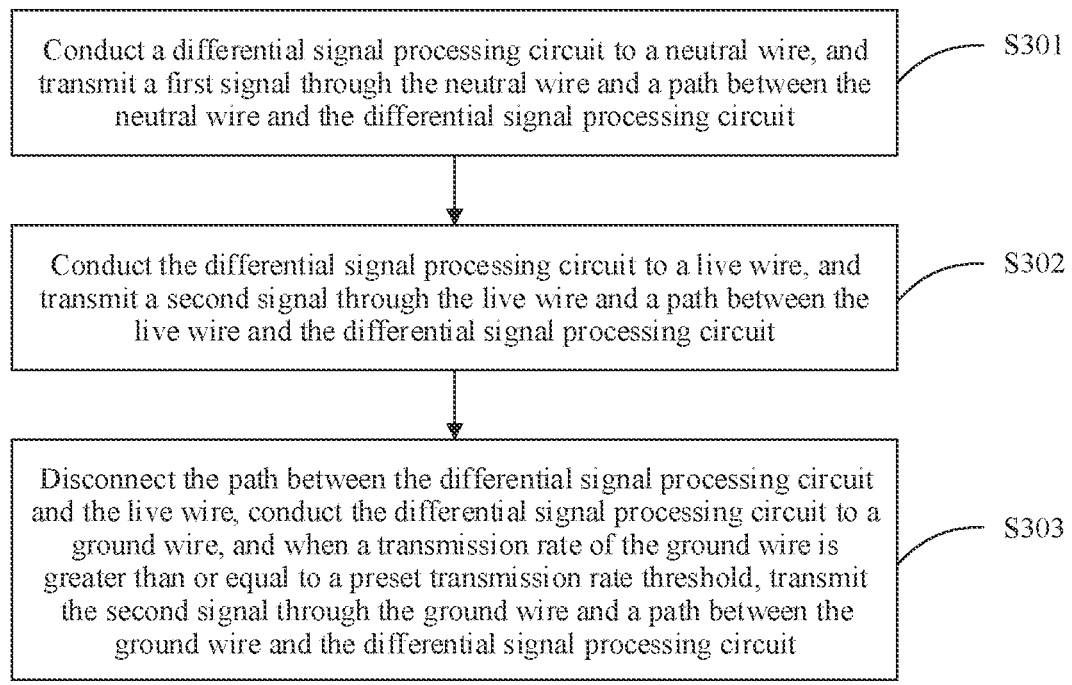
FIG. 8 is a schematic flowchart of another PLC control method according to an embodiment of this application.

FIG. 8 is a schematic flowchart of another PLC control method according to this application. Referring to FIG. 8, the PLC control method includes the following steps.

S301. Conduct a differential signal processing circuit to a neutral wire, and transmit a first signal through the neutral wire and a path between the neutral wire and the differential signal processing circuit.

S302. Conduct the differential signal processing circuit to a live wire, and transmit a second signal through the live wire and a path between the live wire and the differential signal processing circuit.

S301 and S302 are the same as S201 and S202 provided in the foregoing embodiment. For details, refer to S201 and S202.

S303. Disconnect the path between the differential signal processing circuit and the live wire, conduct the differential signal processing circuit to a ground wire, and when a transmission rate of the ground wire is greater than or equal to a preset transmission rate threshold, transmit the second signal through the ground wire and a path between the ground wire and the differential signal processing circuit.

Corresponding to the foregoing embodiment, after the differential signal processing circuit 101 is connected to a ground wire end, the second signal is transmitted to the ground wire, and a transmission rate of the second signal is obtained. If the ground wire exists and performs transmission properly, the second signal input to the ground wire can be normally transmitted. However, if no ground wire exists or a transmission failure occurs on the ground wire, no line serves as a path for transmitting the second signal input to the ground wire or a transmission path fails. In this case, the transmission rate of the second signal is 0 or approximately 0. Therefore, in this embodiment, a transmission rate threshold is also preset. The second signal is input to the ground wire, and if the transmission rate of the ground wire is greater than or equal to the transmission rate threshold, it indicates that the ground wire exists and performs transmission properly. The second signal is transmitted through the ground wire and the path between the ground wire and the differential signal processing circuit.

Figure 9:
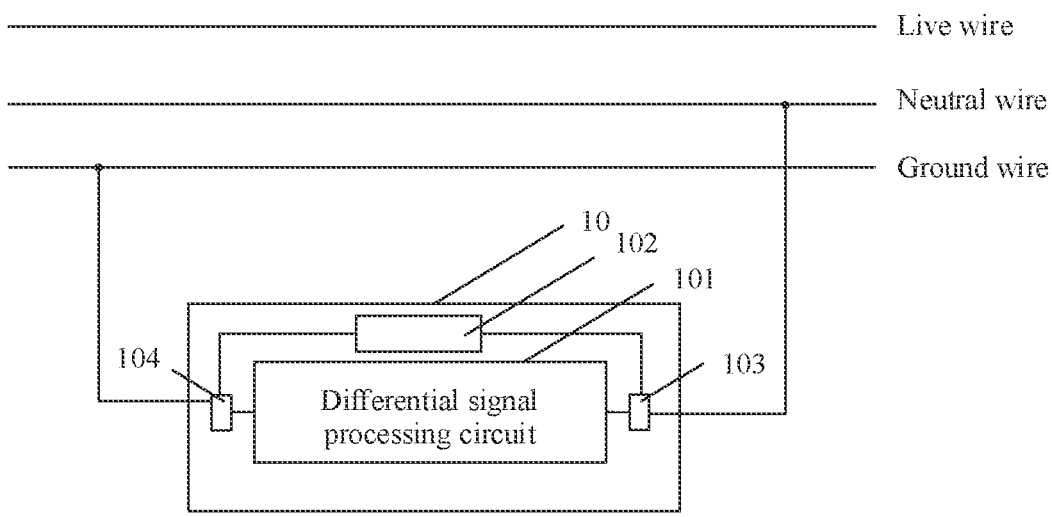
FIG. 9 is a schematic diagram of transmitting a differential signal by a power line communication modem according to an embodiment of this application.
Figure 10:
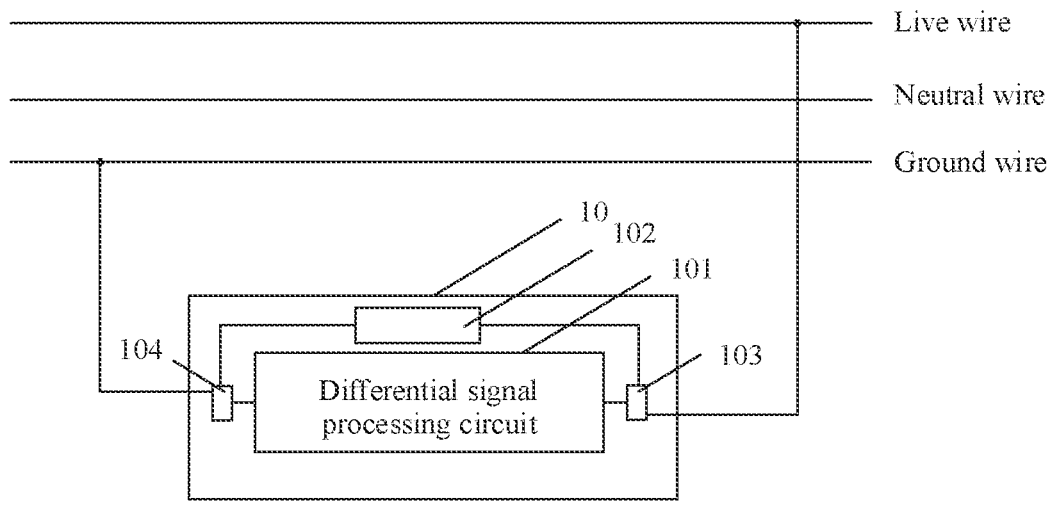
FIG. 10 is a schematic diagram of transmitting a differential signal by a power line communication modem according to an embodiment of this application.

FIG. 9 is a schematic diagram of transmitting a differential signal by a power line communication modem according to an embodiment of this application. After the second signal is transmitted through the ground wire and the path between the ground wire and the differential signal processing circuit 101, the first signal may still be transmitted through the neutral wire and the path between the neutral wire and the differential signal processing circuit 101. Alternatively, FIG. 10 is a schematic diagram of transmitting a differential signal by a power line communication modem according to an embodiment of this application. The switch control module 102 controls the first switch 103 to disconnect the path between the differential signal processing circuit 101 and the neutral wire, and conduct the differential signal processing circuit 101 to the live wire. The first signal is transmitted through the live wire and a path between the live wire and the differential signal processing circuit 101.

Figure 11:
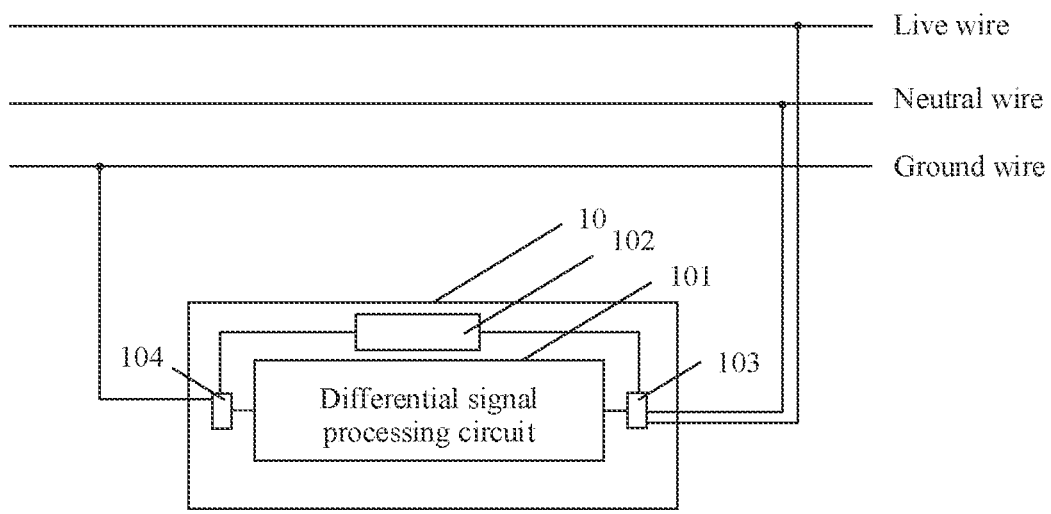
FIG. 11 is a schematic diagram of transmitting a differential signal by a power line communication modem according to an embodiment of this application.

Corresponding to the foregoing embodiment, the first signal may be alternatively transmitted through both the neutral wire and the live wire. FIG. 11 is a schematic diagram of transmitting a differential signal by a power line communication modem according to an embodiment of this application. The switch control module 102 controls the first switch 103 to retain a connection between the neutral wire and the differential signal processing circuit 101, and further controls the first switch 103 to conduct the differential signal processing circuit to the live wire again. The first signal is transmitted jointly through the neutral wire, the path between the neutral wire and the differential signal processing circuit, the live wire, and a path between the live wire and the differential signal processing circuit.

It can be learned from the foregoing embodiment that, a difference of this embodiment from the foregoing embodiment lies in that the second signal is transmitted through the ground wire, and the first signal may be transmitted through the neutral wire, the live wire, or both the neutral wire and the live wire. Likewise, it is ensured that one signal in the differential signal is transmitted through the ground wire. Because interference to the ground wire is small, a transmission signal-to-noise ratio of the power line communication modem is increased compared with that in a conventional transmission mode.

Corresponding to the PLC control methods provided in the foregoing embodiments, this application further provides an embodiment of a PLC control apparatus.

Figure 12:
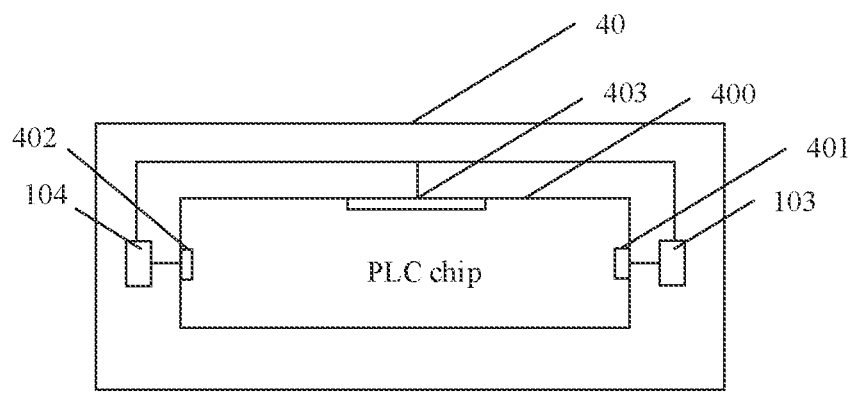
FIG. 12 is a schematic structural diagram of a PLC control apparatus according to an embodiment of this application.

FIG. 12 is a schematic structural diagram of a PLC control apparatus according to an embodiment of this application. It can be learned from FIG. 12 that the PLC control apparatus 40 includes a PLC chip 400, a first switch 103, and a second switch 104 that are disposed in a power line communication modem. Corresponding to FIG. 2, the differential signal processing circuit and the switch control module shown in FIG. 2 are disposed in the PLC chip 400. The differential signal processing circuit is configured to process a differential signal. The differential signal includes a first signal and a second signal. A first signal end 401 of the differential signal processing circuit is used to transmit the first signal. A second signal end 402 of the differential signal processing circuit is used to transmit the second signal. The PLC chip 400 has a control signal end 403. The control signal end 403 is used to output a control signal.

The first signal end 401 is further respectively connected to a live wire and a ground wire through the first switch 103. The second signal is transmitted through the live wire and a path between the live wire and the second signal end 402.

The PLC chip 400 is configured to output the control signal through the control signal end 403. The control signal is used to control the first switch 103 to conduct the first signal end to a neutral wire, and the first signal is transmitted through the neutral wire and a path between the neutral wire and the first signal end 401.

The control signal is further used to control the first switch 103 to disconnect the path between the first signal end and the neutral wire, and control the first switch 103 to conduct the first signal end 401 to the ground wire. When a transmission rate of the ground wire is greater than or equal to a preset transmission rate threshold, the first signal is transmitted through the ground wire and a path between the ground wire and the first signal end 401.

Figure 13:
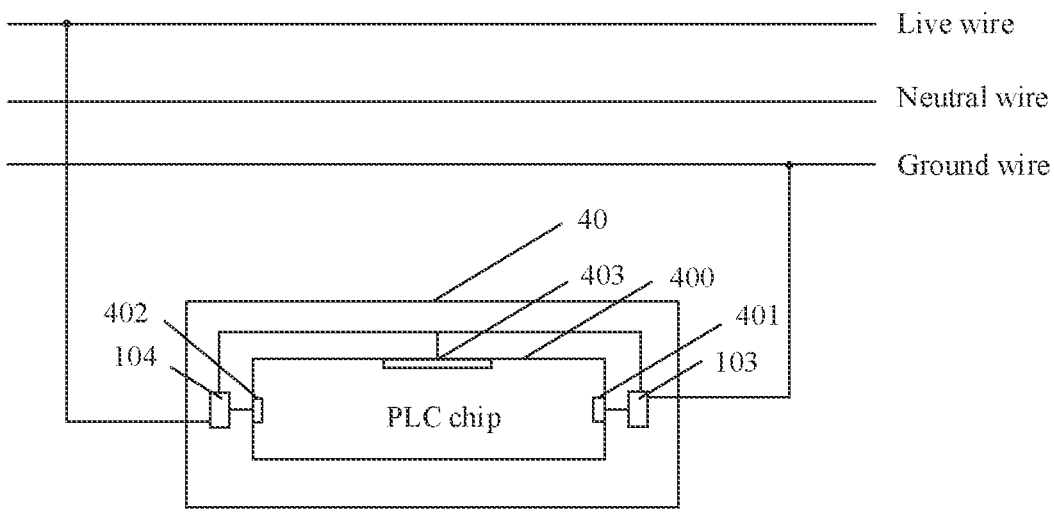
FIG. 13 is a schematic diagram of transmitting a differential signal by a PLC control apparatus according to an embodiment of this application.

If the first signal is transmitted through the ground wire and the path between the ground wire and the first signal end 401, FIG. 13 is a schematic diagram of transmitting a differential signal by a PLC control apparatus according to an embodiment of this application. The second signal may still be transmitted through the live wire and the path between the live wire and the second signal end 402.

Figure 14:
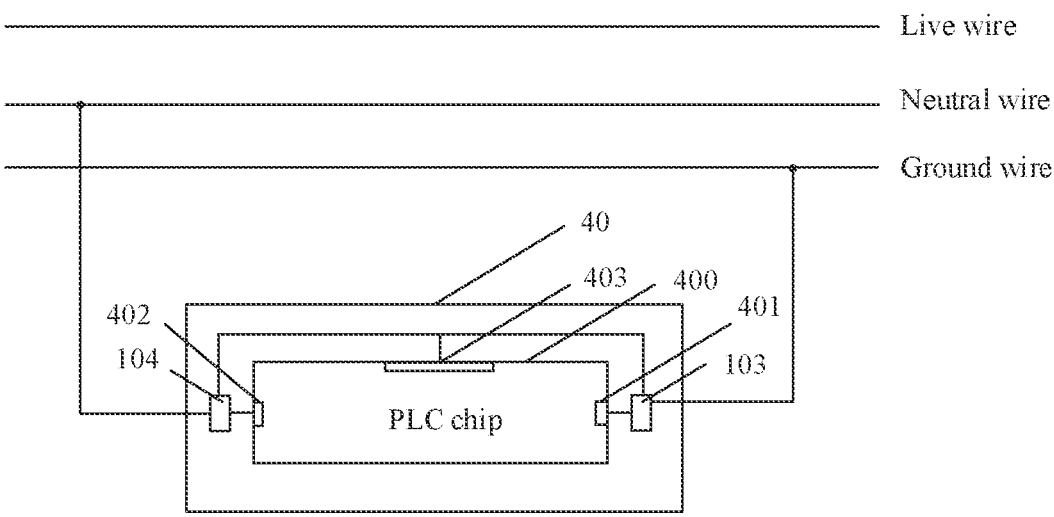
FIG. 14 is a schematic diagram of transmitting a differential signal by a PLC control apparatus according to an embodiment of this application.
Figure 15:
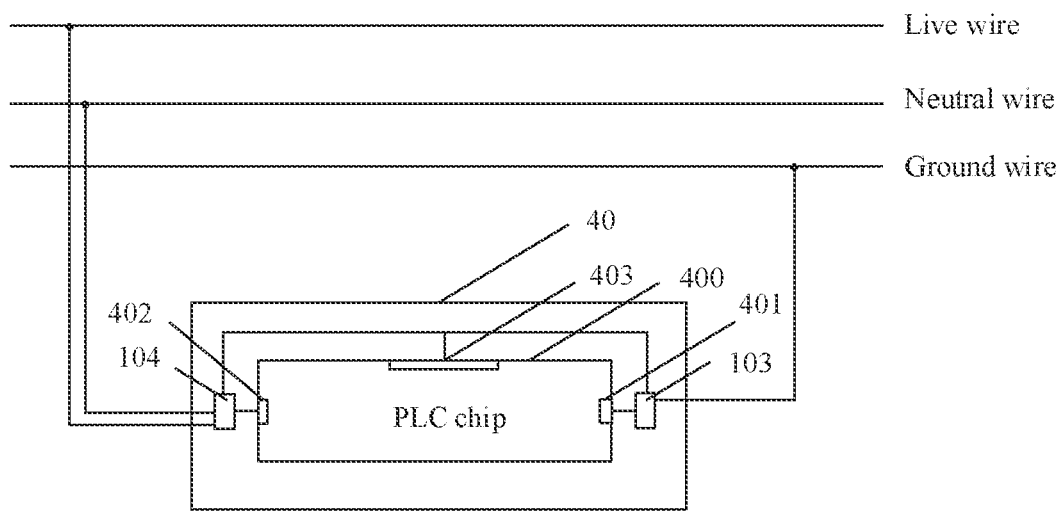
FIG. 15 is a schematic diagram of transmitting a differential signal by a PLC control apparatus according to an embodiment of this application.

In addition to the foregoing manner, this embodiment of this application further provides the following two manners. In a first manner, FIG. 14 is a schematic diagram of transmitting a differential signal by a PLC control apparatus according to an embodiment of this application. The second signal end 402 is respectively connected to the live wire and the neutral wire through the second switch 104. The control signal is further used to control the second switch 104 to disconnect the path between the second signal end 402 and the live wire, and control the second switch 104 to conduct the second signal end 402 to the neutral wire. The second signal is transmitted through the neutral wire and a path between the neutral wire and the second signal end 402. In a second manner, FIG. 15 is a schematic diagram of transmitting a differential signal by a PLC control apparatus according to an embodiment of this application. The second signal end 402 is connected to the neutral wire through the second switch 104. The control signal is further used to control the second switch 104 to conduct the second signal end 402 to the neutral wire. The second signal is transmitted jointly through the neutral wire, a path between the neutral wire and the second signal end 402, the live wire, and the path between the live wire and the second signal end 402.

Figure 16:
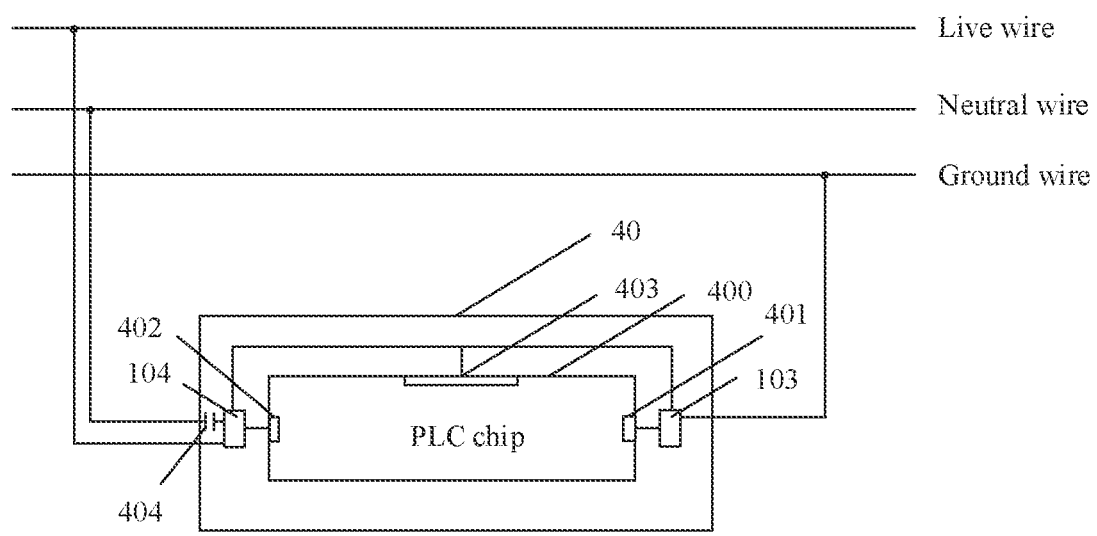
FIG. 16 is a schematic diagram of transmitting a differential signal by a PLC control apparatus according to an embodiment of this application.

If the second signal is transmitted jointly through the neutral wire, the path between the neutral wire and the second signal end 402, the live wire, and the path between the live wire and the second signal end 402, a differential-mode noise exists between the neutral wire and the live wire. In view of this, FIG. 16 is a schematic diagram of transmitting a differential signal by a PLC control apparatus according to an embodiment of this application. The PLC control apparatus 40 further includes a coupling capacitor 404. Two ends of the coupling capacitor 404 are electrically connected to the second switch 104 and the neutral wire respectively, and the differential-mode noise between the neutral wire and the live wire is eliminated using the coupling capacitor 404.

Figure 17:
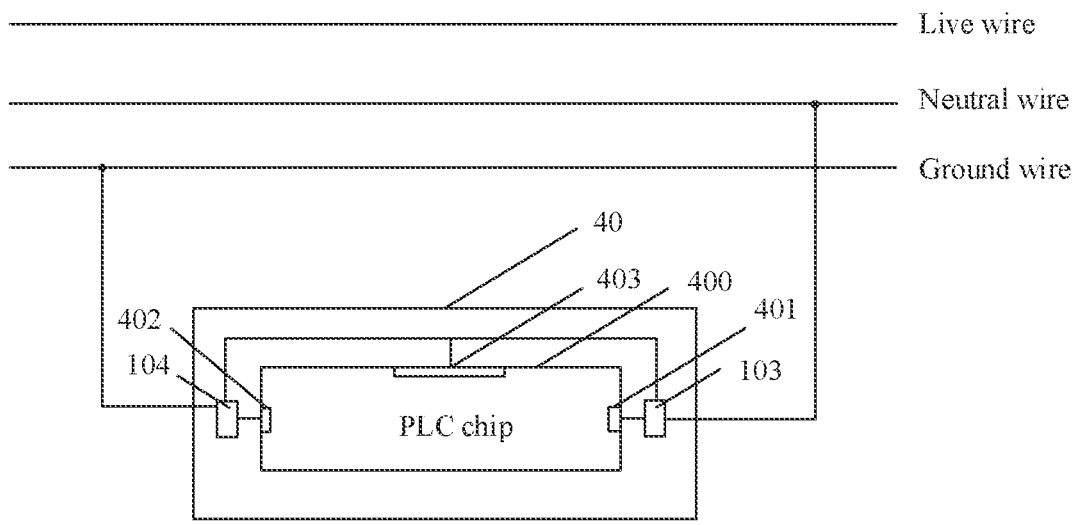
FIG. 17 is a schematic diagram of transmitting a differential signal by a PLC control apparatus according to an embodiment of this application.

In the foregoing embodiment, the control signal is used to control the first switch 103 to disconnect the path between the first signal end and the neutral wire, and control the first switch 103 to conduct the first signal end 401 to the ground wire. The first signal is transmitted through the ground wire and a path between the ground wire and the first signal end 401. If the control signal is used to control the second switch 104 to disconnect the path between the second signal end 402 and the live wire, and control the second switch 104 to conduct the second signal end 402 to the ground wire, when a transmission rate of the ground wire is greater than or equal to a preset transmission rate threshold, the second signal is transmitted through the ground wire and a path between the ground wire and the second signal end 402. FIG. 17 is a schematic diagram of transmitting a differential signal by a PLC control apparatus according to an embodiment of this application. The first signal may still be transmitted through the neutral wire and the path between the neutral wire and the first signal end 401.

Figure 18:
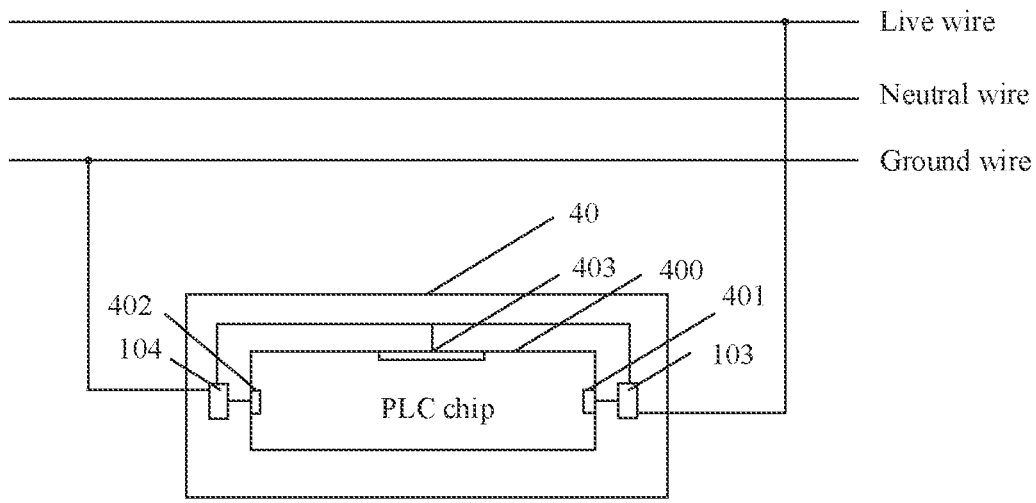
FIG. 18 is a schematic diagram of transmitting a differential signal by a PLC control apparatus according to an embodiment of this application.
Figure 19:
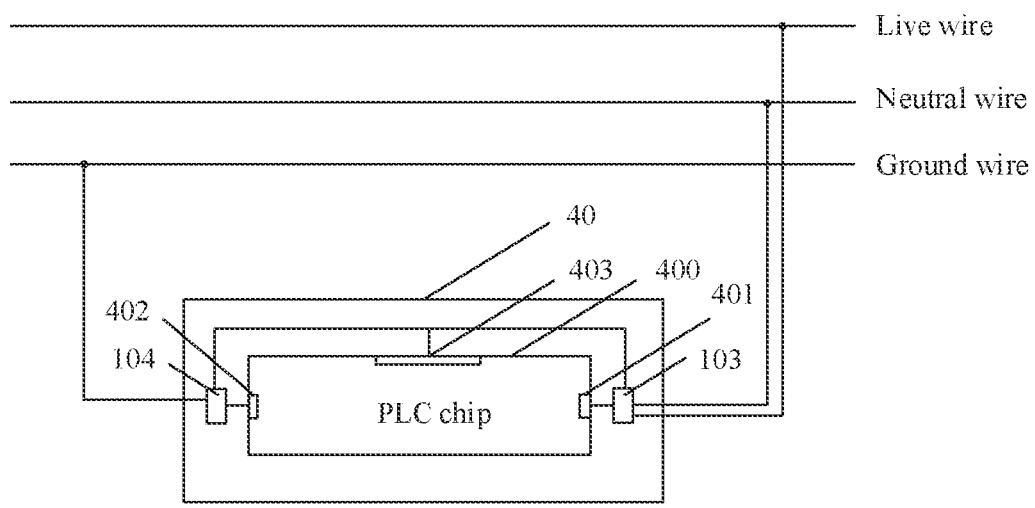
FIG. 19 is a schematic diagram of transmitting a differential signal by a PLC control apparatus according to an embodiment of this application.

In addition to the foregoing manner, this embodiment of this application further provides the following two manners. In a first manner, FIG. 18 is a schematic diagram of transmitting a differential signal by a PLC control apparatus according to an embodiment of this application. The first signal end 401 is respectively connected to the live wire and the neutral wire through the first switch 103. The control signal is further used to control the first switch 103 to disconnect the path between the first signal end 401 and the neutral wire, and control the first switch 103 to conduct the first signal end 401 to the live wire. The first signal is transmitted through the live wire and a path between the live wire and the first signal end 401. In a second manner, FIG. 19 is a schematic diagram of transmitting a differential signal by a PLC control apparatus according to an embodiment of this application. The first signal end 401 is connected to the live wire through the first switch 103. The control signal is further used to control the first switch 103 to conduct the first signal end 401 to the live wire. The first signal is transmitted jointly through the neutral wire, the path between the neutral wire and the first signal end 401, the live wire, and a path between the live wire and the first signal end 401.

Figure 20:
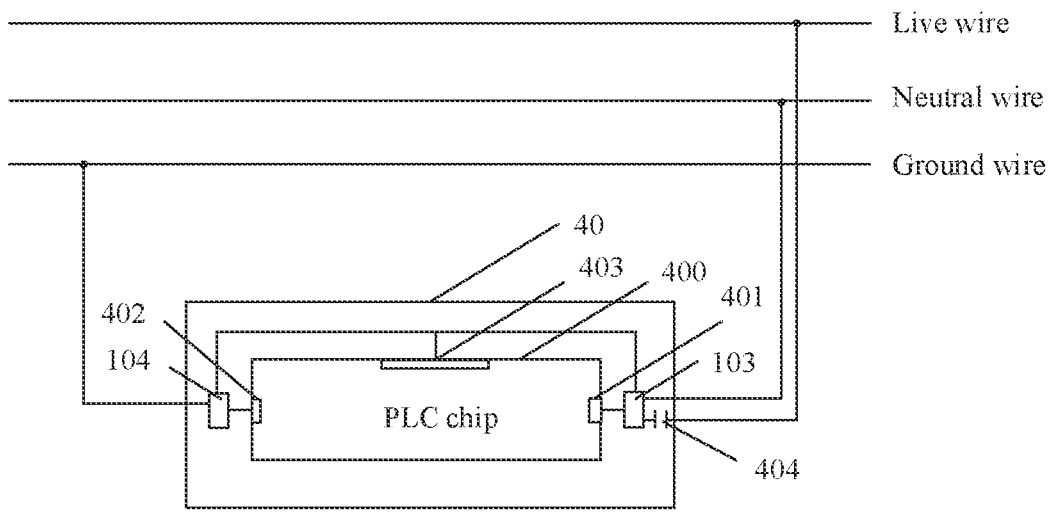
FIG. 20 is a schematic diagram of transmitting a differential signal by a PLC control apparatus according to an embodiment of this application.

Similar to the corresponding case in FIG. 15, in FIG. 19, the first signal is transmitted jointly through the neutral wire, the path between the neutral wire and the first signal end 401, the live wire, and the path between the live wire and the first signal end 402, and a differential-mode noise exists between the neutral wire and the live wire. In view of this, FIG. 20 is a schematic diagram of transmitting a differential signal by a PLC control apparatus according to an embodiment of this application. The PLC control apparatus 40 further includes a coupling capacitor 404. Two ends of the coupling capacitor 404 are electrically connected to the first switch 103 and the live wire respectively, and the differential-mode noise between the neutral wire and the live wire is eliminated using the coupling capacitor 404.

It can be learned from the foregoing embodiment that, this embodiment provides a PLC control apparatus, and the PLC chip 400 controls, using the control signal, the first switch 103 and the second switch 104 to transmit any signal in the differential signal through the ground wire. Interference to the ground wire is small, and a part of power grid noise is isolated. Compared with that in a conventional transmission mode, a transmission signal-to-noise ratio of the power line communication modem is increased.

Corresponding to the first PLC control method provided in the foregoing embodiment, this application further provides an embodiment of a PLC chip.

Figure 21:
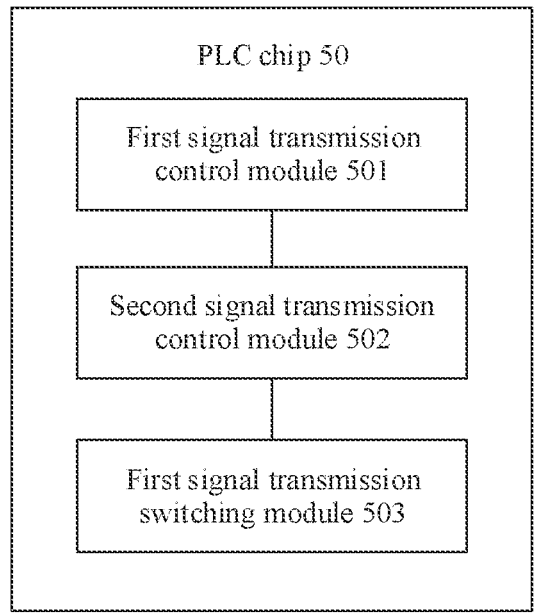
FIG. 21 is a schematic structural diagram of a PLC chip according to an embodiment of this application.

FIG. 21 is a schematic structural diagram of a PLC chip according to an embodiment of this application. The PLC chip 50 includes a first signal transmission control module 501, a second signal transmission control module 502, and a first signal transmission switching module 503.

The first signal transmission control module 501 is configured to conduct a differential signal processing circuit to a neutral wire, and transmit a first signal through the neutral wire and a path between the neutral wire and the differential signal processing circuit. The differential signal processing circuit is configured to process a differential signal.

The second signal transmission control module 502 is configured to conduct the differential signal processing circuit to a live wire, and transmit a second signal through the live wire and a path between the live wire and the differential signal processing circuit.

The first signal transmission switching module 503 is configured to disconnect the path between the differential signal processing circuit and the neutral wire, conduct the differential signal processing circuit to a ground wire, and when a transmission rate of the ground wire is greater than or equal to a preset transmission rate threshold, transmit the first signal through the ground wire and a path between the ground wire and the differential signal processing circuit.

The first signal transmission switching module 503 further includes a first signal transmission switching unit, configured to disconnect the path between the differential signal processing circuit and the live wire, conduct the differential signal processing circuit to the neutral wire, and transmit the second signal through the neutral wire and a path between the neutral wire and the differential signal processing circuit.

The first signal transmission switching module 503 further includes a second signal transmission switching unit, configured to conduct the differential signal processing circuit to the neutral wire, and transmit the second signal jointly through the neutral wire, a path between the neutral wire and the differential signal processing circuit, the live wire, and the path between the live wire and the differential signal processing circuit.

It can be learned from the foregoing embodiment that, because interference to the ground wire is small, the first signal transmission switching module 503 transmits the first signal through the ground wire, so that a part of power grid noise is isolated. Regardless of whether the second signal is transmitted through the live wire, the neutral wire, or both the neutral wire and the live wire, a transmission signal-to-noise ratio of a power line communication modem is increased compared with that in a conventional transmission mode.

Corresponding to the second PLC control method provided in the foregoing embodiment, this application further provides an embodiment of another PLC chip.

Figure 22:
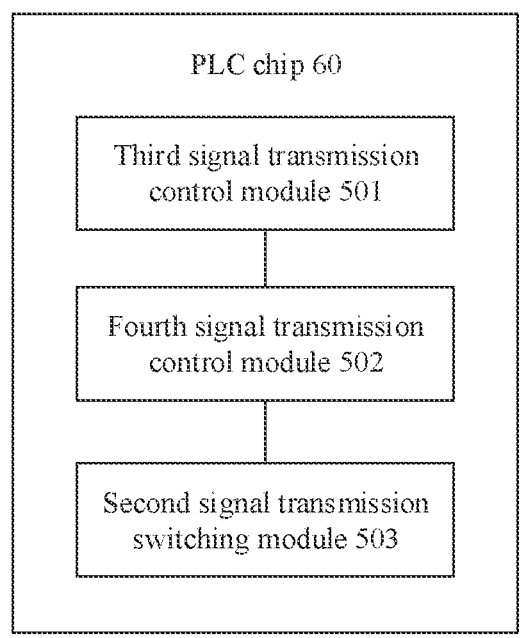
FIG. 22 is a schematic structural diagram of another PLC chip according to an embodiment of this application.

FIG. 22 is a schematic structural diagram of another PLC chip according to an embodiment of this application. The PLC chip 60 includes a third signal transmission control module 601, a fourth signal transmission control module 602, and a second signal transmission switching module 603.

The third signal transmission control module 601 is configured to conduct a differential signal processing circuit to a neutral wire, and transmit a first signal through the neutral wire and a path between the neutral wire and the differential signal processing circuit. The differential signal processing circuit is configured to process a differential signal.

The fourth signal transmission control module 602 is configured to conduct the differential signal processing circuit to a live wire, and transmit a second signal through the live wire and a path between the live wire and the differential signal processing circuit.

The second signal transmission switching module 603 is configured to disconnect the path between the differential signal processing circuit and the live wire, conduct the differential signal processing circuit to a ground wire, and when a transmission rate of the ground wire is greater than or equal to a preset transmission rate threshold, transmit the second signal through the ground wire and a path between the ground wire and the differential signal processing circuit.

The second signal transmission switching module 603 further includes a third signal transmission switching unit, configured to disconnect the path between the differential signal processing circuit and the neutral wire, conduct the differential signal processing circuit to the live wire, and transmit the first signal through the live wire and a path between the live wire and the differential signal processing circuit.

The second signal transmission switching module 603 further includes a fourth signal transmission switching unit, configured to conduct the differential signal processing circuit to the live wire, and transmit the second signal jointly through the live wire, a path between the live wire and the differential signal processing circuit, the neutral wire, and the path between the neutral wire and the differential signal processing circuit.

It can be learned from the foregoing embodiment that, because interference to the ground wire is small, the second signal transmission switching module 603 transmits the second signal through the ground wire, so that a part of power grid noise is isolated. Regardless of whether the first signal is transmitted through the live wire, the neutral wire, or both the neutral wire and the live wire, a transmission signal-to-noise ratio of a power line communication modem is increased compared with that in a conventional transmission mode.

Figure 23:
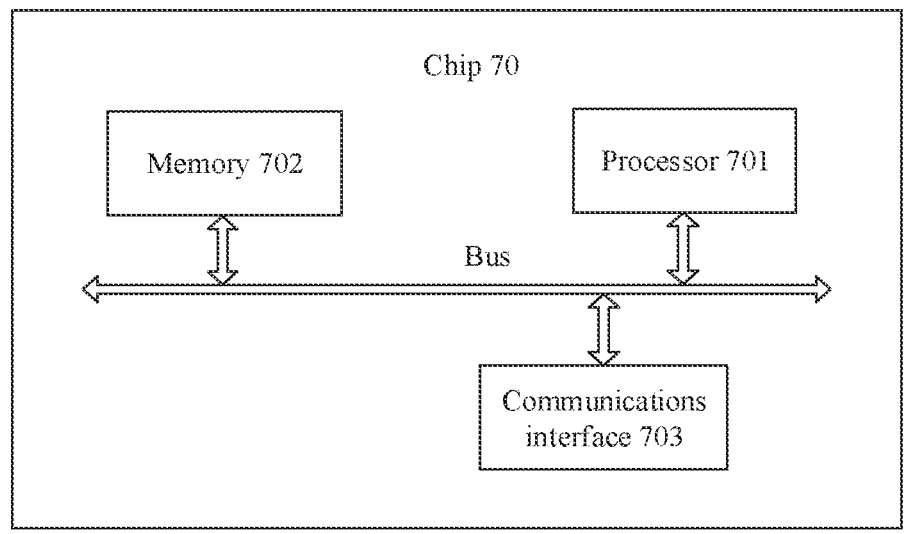
FIG. 23 is a schematic structural diagram of a chip according to an embodiment of this application.

FIG. 23 is a schematic structural diagram of a chip according to an embodiment of this application. The chip 70 includes a processor 701, a memory 702, and a communications interface 703.

The memory 702 is configured to store a computer-executable instruction. When executing the computer-executable instruction, the processor 701 performs the following operations:

conducting a differential signal processing circuit to a neutral wire, and transmitting a first signal through the neutral wire and a path between the neutral wire and the differential signal processing circuit, where the differential signal processing circuit is configured to process a differential signal;

conducting the differential signal processing circuit to a live wire, and transmitting a second signal through the live wire and a path between the live wire and the differential signal processing circuit; and disconnecting the path between the differential signal processing circuit and the neutral wire, conducting the differential signal processing circuit to a ground wire, and when a transmission rate of the ground wire is greater than or equal to a preset transmission rate threshold, transmitting the first signal through the ground wire and a path between the ground wire and the differential signal processing circuit.

In a process of executing the computer-executable instruction, the processor 701 may further perform the following operations:

disconnecting the path between the differential signal processing circuit and the live wire, conducting the differential signal processing circuit to the neutral wire, and transmitting the second signal through the neutral wire and a path between the neutral wire and the differential signal processing circuit; or conducting the differential signal processing circuit to the neutral wire, and transmitting the second signal jointly through the neutral wire, a path between the neutral wire and the differential signal processing circuit, the live wire, and the path between the live wire and the differential signal processing circuit.

The processor 701, the memory 702, and the communications interface 703 may be connected to each other through a bus. The bus may be classified into an address bus, a data bus, a control bus, and the like. For ease of representation, only one thick line is used to represent the bus in FIG. 21, but this does not mean that there is only one bus or only one type of bus.

Figure 24:
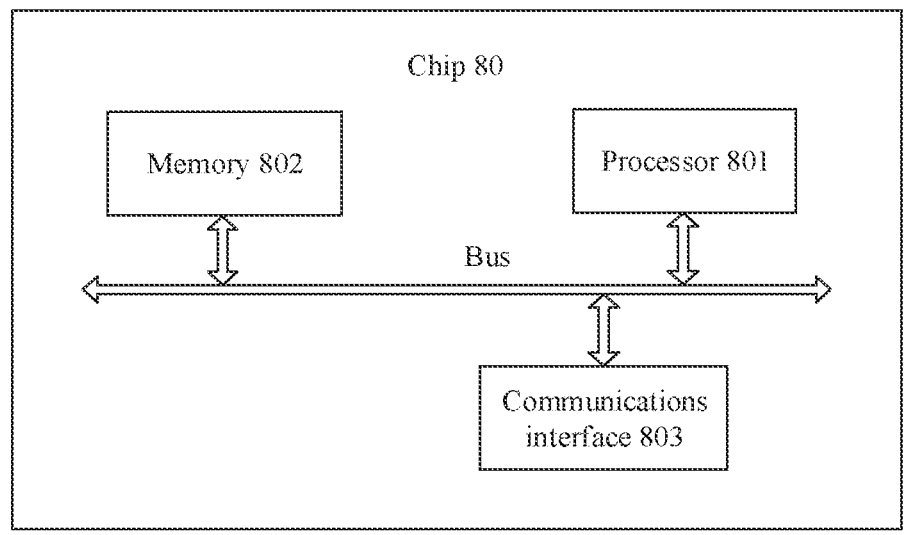
FIG. 24 is a schematic structural diagram of another chip according to an embodiment of this application.

FIG. 24 is a schematic structural diagram of another chip according to an embodiment of this application. The chip 80 includes a processor 801, a memory 802, and a communications interface 803.

The memory 802 is configured to store a computer-executable instruction. When executing the computer-executable instruction, the processor 801 performs the following operations:

conducting a differential signal processing circuit to a neutral wire, and transmitting a first signal through the neutral wire and a path between the neutral wire and the differential signal processing circuit, where the differential signal processing circuit is configured to process a differential signal;

conducting the differential signal processing circuit to a live wire, and transmitting a second signal through the live wire and a path between the live wire and the differential signal processing circuit; and disconnecting the path between the differential signal processing circuit and the live wire, conducting the differential signal processing circuit to a ground wire, and when a transmission rate is greater than or equal to a preset transmission rate threshold, transmitting the second signal through the ground wire and a path between the ground wire and the differential signal processing circuit.

The processor 801 may further perform the following operations:

disconnecting the path between the differential signal processing circuit and the neutral wire, conducting the differential signal processing circuit to the live wire, and transmitting the first signal through the live wire and a path between the live wire and the differential signal processing circuit; or conducting the differential signal processing circuit to the live wire, and transmitting the first signal jointly through the live wire, a path between the live wire and the differential signal processing circuit, the neutral wire, and the path between the neutral wire and the differential signal processing circuit.

The processor 801, the memory 802, and the communications interface 803 may be connected to each other through a bus. The bus may be classified into an address bus, a data bus, a control bus, and the like. For ease of representation, only one thick line is used to represent the bus in FIG. 22, but this does not mean that there is only one bus or only one type of bus.

In the foregoing embodiments, the processor (including the processor 701 and the processor 801) may be a general-purpose processor, for example, a central processing unit (CPU), a network processor (NP), or a combination of a CPU and an NP. Alternatively, the processor may be a micro control unit (MCU). The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), or the like.

The memory (including the memory 702 and the memory 802) may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The communications interface (including the communications interface 703 and the communications interface 803) is used for the PLC chip to transmit a differential signal and send a control signal. The communications interface includes a wired communications interface, and may further include a wireless communications interface. The wired communications interface includes a PLC interface, and may further include an Ethernet interface. The wireless communications interface may be a WLAN interface, a cellular network communications interface, a combination thereof, or the like.

The PLC chip may further include a power supply component, configured to supply power to various components of the PLC chip. The power supply component may include a power management system, and one or more power supplies.

It should be noted that in this specification, relational terms such as "first" and "second" are only used to distinguish one entity or operation from another, and do not necessarily require or imply that any actual relationship or sequence exists between these entities or operations. Moreover, the terms "include", "comprise", or any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

For same or similar parts in the embodiments in this specification of this application, refer to each other. Especially, the apparatus, PLC chip, and chip embodiments are basically similar to the PLC control method embodiment, and therefore are described briefly; for related parts, refer to descriptions in the PLC control method embodiment.

The foregoing descriptions are implementations of this application, but are not intended to limit the protection scope of this application.

What is claimed is:

1. A method comprising:
   connecting a differential signal processing circuit to a neutral wire for transmitting a differential signal in a power line communication (PLC), the differential signal comprising a first signal and a second signal, and transmitting the first signal of the differential signal through the neutral wire and a first path between the neutral wire and the differential signal processing circuit, wherein the differential signal processing circuit is configured to process the differential signal;
   connecting the differential signal processing circuit to a live wire, and transmitting the second signal of the differential signal through the live wire and a second path between the live wire and the differential signal processing circuit; and
   disconnecting the first path between the differential signal processing circuit and the neutral wire, connecting the differential signal processing circuit to a ground wire, and when a transmission rate of the ground wire is greater than or equal to a preset transmission rate threshold, transmitting the first signal through the ground wire and a third path between the ground wire and the differential signal processing circuit.

2. The method of claim 1, wherein the method further comprises:
   disconnecting the second path between the differential signal processing circuit and the live wire, connecting the differential signal processing circuit to the neutral wire, and transmitting the second signal through the neutral wire and a fourth path between the neutral wire and the differential signal processing circuit.

3. The method of claim 1, wherein the method further comprises:
   connecting the differential signal processing circuit to the neutral wire, and transmitting the second signal jointly through the neutral wire, a fourth path between the neutral wire and the differential signal processing circuit, the live wire, and the second path between the live wire and the differential signal processing circuit.

4. A method comprising:
   connecting a differential signal processing circuit to a neutral wire for transmitting a differential signal in a power line communication (PLC), the differential signal comprising a first signal and a second signal, and transmitting the first signal of the differential signal through the neutral wire and a first path between the neutral wire and the differential signal processing circuit, wherein the differential signal processing circuit is configured to process the differential signal;
   connecting the differential signal processing circuit to a live wire, and transmitting the second signal of the differential signal through the live wire and a second path between the live wire and the differential signal processing circuit; and
   disconnecting the second path between the differential signal processing circuit and the live wire, connecting the differential signal processing circuit to a ground wire, and when a transmission rate of the ground wire is greater than or equal to a preset transmission rate threshold, transmitting the second signal through the ground wire and a third path between the ground wire and the differential signal processing circuit.

5. The method of claim 4, wherein the method further comprises:
   disconnecting the first path between the differential signal processing circuit and the neutral wire, connecting the differential signal processing circuit to the live wire, and transmitting the first signal through the live wire and a fourth path between the live wire and the differential signal processing circuit.

6. The method of claim 4, wherein the method further comprises:
   connecting the differential signal processing circuit to the live wire, and transmitting the first signal jointly through the live wire, a fourth path between the live wire and the differential signal processing circuit, the neutral wire, and the first path between the neutral wire and the differential signal processing circuit.

7. An apparatus comprising:
   a differential signal processing circuit comprising a first signal end and a second signal end, wherein the differential signal processing circuit is configured to:
      process a differential signal in a power line communication (PLC), wherein the differential signal comprises a first signal and a second signal, wherein the first signal end of the differential signal processing circuit is configured to transmit the first signal, and the second signal end of the differential signal processing circuit is configured to transmit the second signal, and wherein the second signal is transmitted through a live wire and a first path between the live wire and the second signal end;
   a first switch, configured to connect the first signal end of the differential signal processing circuit to the live wire and a ground wire, respectively, through the first switch; and
   a PLC chip comprising a control signal end, and wherein the control signal end is configured to output control signals, and the PLC chip is configured to, using the control signals:
      control the first switch to connect the first signal end to a neutral wire, wherein the first signal is transmitted through the neutral wire and a second path between the neutral wire and the first signal end;
      control the first switch to disconnect the second path between the first signal end and the neutral wire; and
      control the first switch to connect the first signal end to the ground wire, wherein the first signal is transmitted through the ground wire and a third path between the ground wire and the first signal end when a transmission rate of the ground wire is greater than or equal to a preset transmission rate threshold.

8. The apparatus of claim 7, wherein the apparatus further comprises:

a second switch, configured to connect the second signal end to the live wire and the neutral wire, respectively, through the second switch; and wherein the PLC chip is further configured to, using the control signals:

control the second switch to disconnect the first path between the second signal end and the live wire; and control the second switch to connect the second signal end to the neutral wire, wherein the second signal is transmitted through the neutral wire and a fourth path between the neutral wire and the second signal end.

9. The apparatus of claim 7, wherein the apparatus further comprises:

a second switch, configured to connect the second signal end to the neutral wire through the second switch; and wherein the PLC chip is further configured to:

control the second switch to connect the second signal end to the neutral wire, wherein the second signal is transmitted jointly through the neutral wire, a fourth path between the neutral wire and the second signal end, the live wire, and the first path between the live wire and the second signal end.

10. The apparatus of claim 9, wherein the apparatus further comprises a coupling capacitor electrically connected between the second switch and the neutral wire.

* * * * *